Dec. 3, 1968    G. H. JANTZEN    3,414,291

REAR SEAT BELT RETRACTOR SYSTEM

Filed July 14, 1967    4 Sheets-Sheet 1

INVENTOR.
GEORGE H. JANTZEN
BY
M. R. Kestenbaum
ATTORNEY

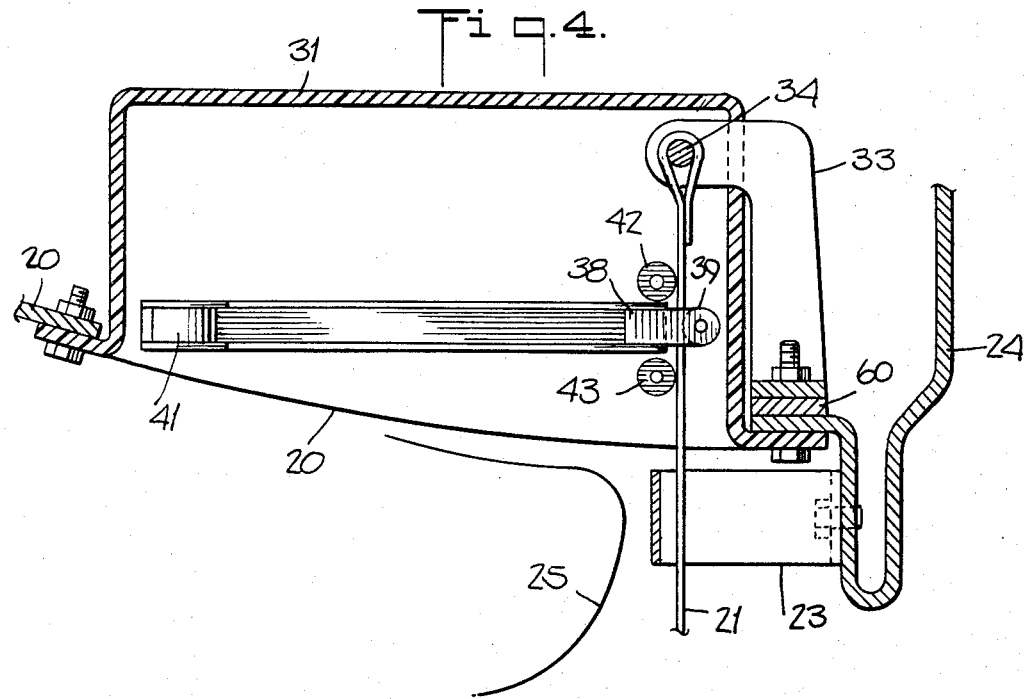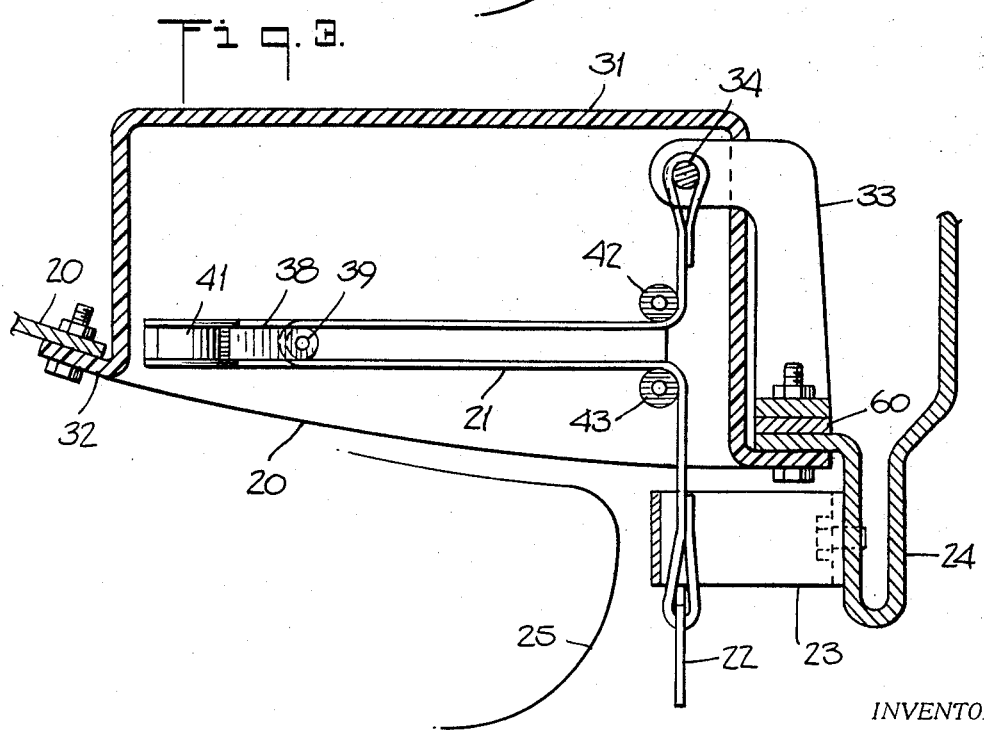

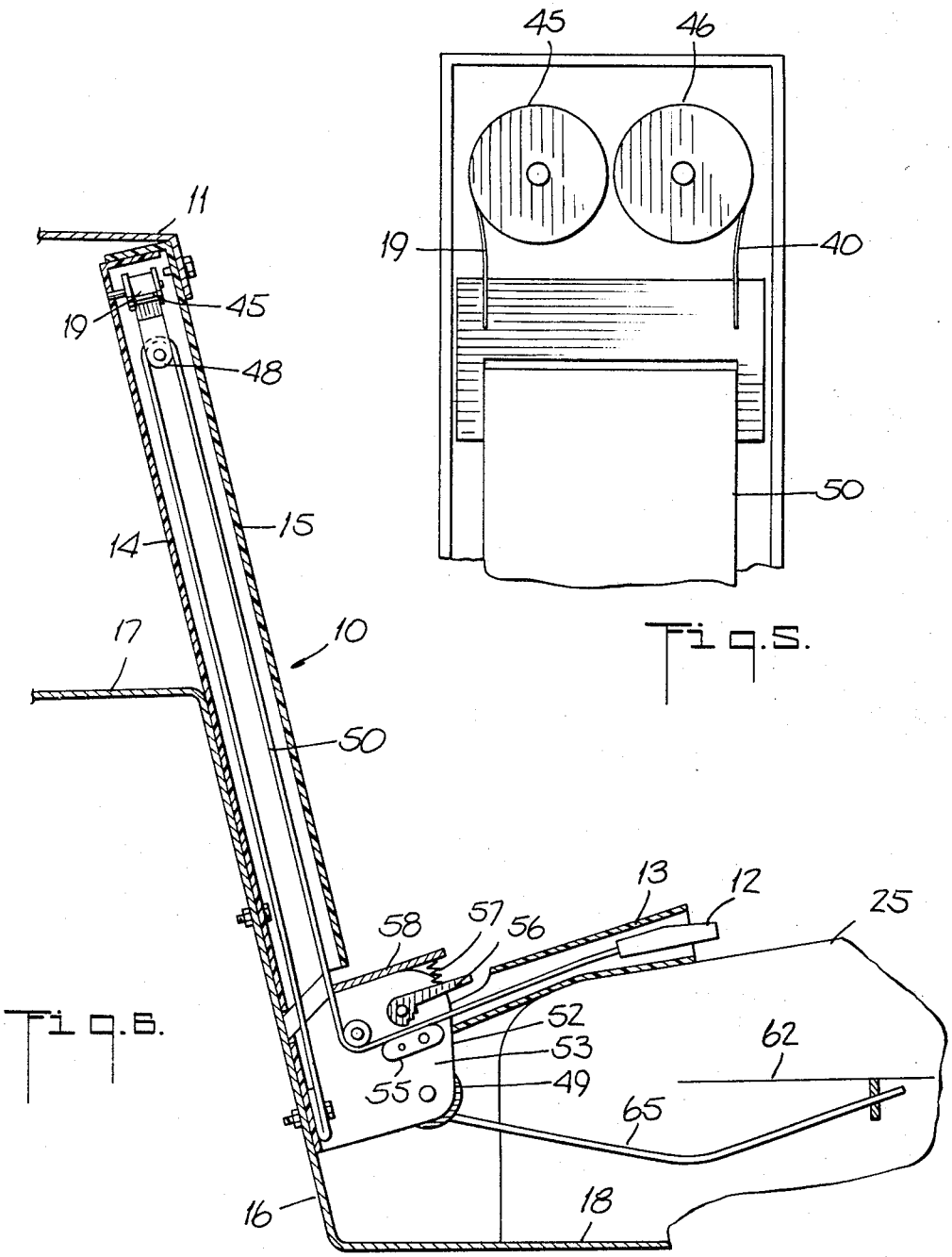

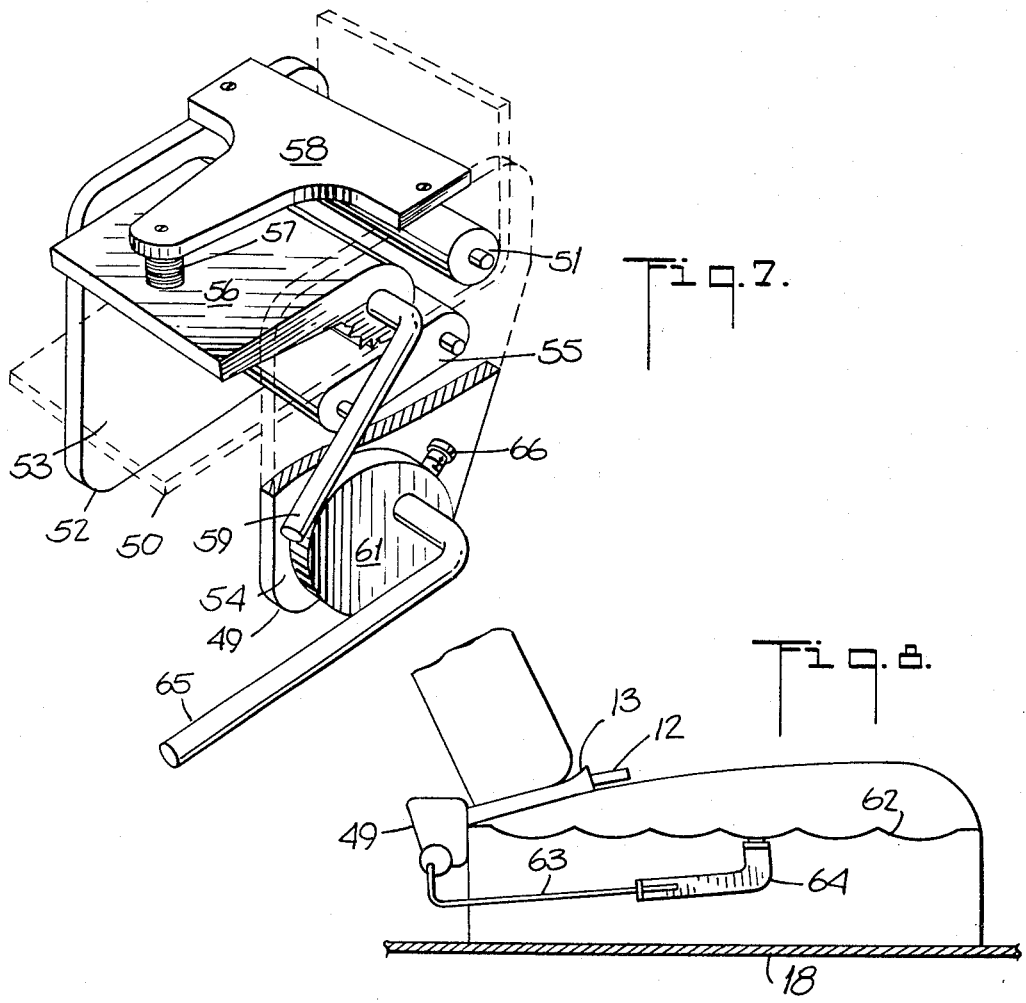
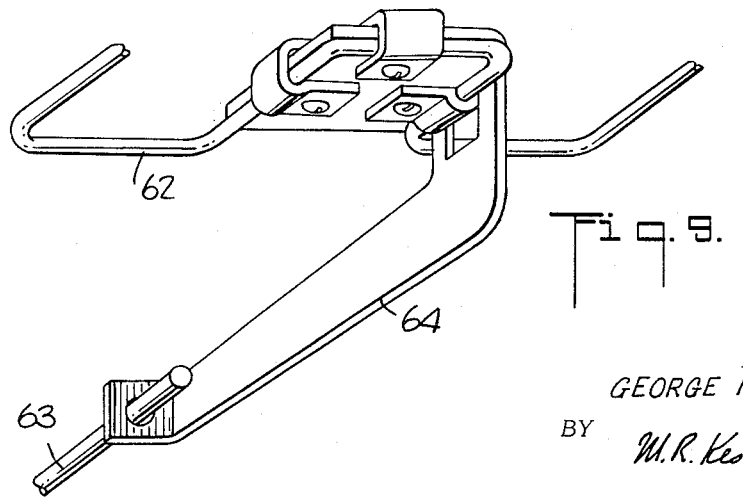

United States Patent Office 3,414,291
Patented Dec. 3, 1968

3,414,291
REAR SEAT BELT RETRACTOR SYSTEM
George H. Jantzen, New York, N.Y., assignor to M. Steinthal & Company Incorporated, New York, N.Y., a corporation of New York
Filed July 14, 1967, Ser. No. 653,483
11 Claims. (Cl. 280—150)

ABSTRACT OF THE DISCLOSURE

Retractors for both seat belt straps are provided passengers sitting three abreast in the rear seat. An outboard retractor is mounted in a cut-out in the rear wheel well so that the seat belt can be positioned along the vehicle side. An inboard retractor is mounted downwardly behind the rear seat backrest and has a snubber mechanism which is responsive to the presence and absence of the passenger and automatically retracts the belt when the passenger leaves the seat.

---

This invention relates to seat belt retractors and more particularly to a retractor system for the rear seats of automobiles and the like.

A great deal of attention has been given to provide seat belts and seat belt retractors for automobiles. The principal interest heretofore has resided in seat belts for front seat occupants. The success of seat belts for front seat use has brought along—or made mandatory—seat belts on the rear seat as well. Typically, this has been accomplished by taking the hardware, including the retractors, which was designed for the front seat and placing it on and about the rear seat as best as could be done. The present invention takes a fresh look at the rear seat and provides an off-the-seat retractor system for the buckle and release fitting straps which takes advantage of the characteristics of the rear seat.

Accordingly, it is an object of this invention to provide a seat belt retractor system for the rear seat of vehicles.

Another object of this invention is to provide an off-the-rear seat retractor for both belt straps.

A further object of this invention is to provide individual full retraction systems for passengers sitting three abreast in the rear seat.

Another object of this invention is to take the characteristics of the rear seat environment, such as the rear wheel wells, the area behind the rear seat and the trunk contours and to utilize them to special advantage in a rear seat retractor system.

A further object of this invention is to provide a retractor system for rear seats which is responsive to individual occupancy at any one of several positions on the seat and which will automatically retract an extended strap upon removal of such occupancy.

These objects are achieved in the present invention by a system of retractors in which the retractor mechanism for each belt strap is located off the seat and in suitable receivers, taking advantage of the natural receiving spaces peculiar to the rear seat area. The retractors for each of the outboard belt straps are located in the wheel wells. The inner retractors are elongated to utilize the structural orientation and arrangement between the rear deck and the floor just behind the rear seat.

The inboard retractors are provided with sensing mechanisms which are automatically responsive to the removal of the passenger from an individual seat position to retract the belt straps therefrom. A cam arrangement provides critical adjustment access to this mechanism from the rear seat.

These and other objects and features of the present invention will be made amply clear from the following description taken together with the drawings in which:

FIGURES 3 and 4 are schematic views of the outboard retractor in the retracted and extended positions respectively.

FIGURE 5 is an enlarged plan view of the upper portion of an inboard retractor.

FIGURE 6 is a schematic view of the inboard retractor showing the occupant sensing mechanism.

FIGURE 7 is an isometric view of the occupancy sensing mechanism.

FIGURE 8 is a schematic view of a second embodiment of the sensing arm of the sensing mechanism, and FIGURE 9 is an isometric view of the second sensing arm.

Figure 1:
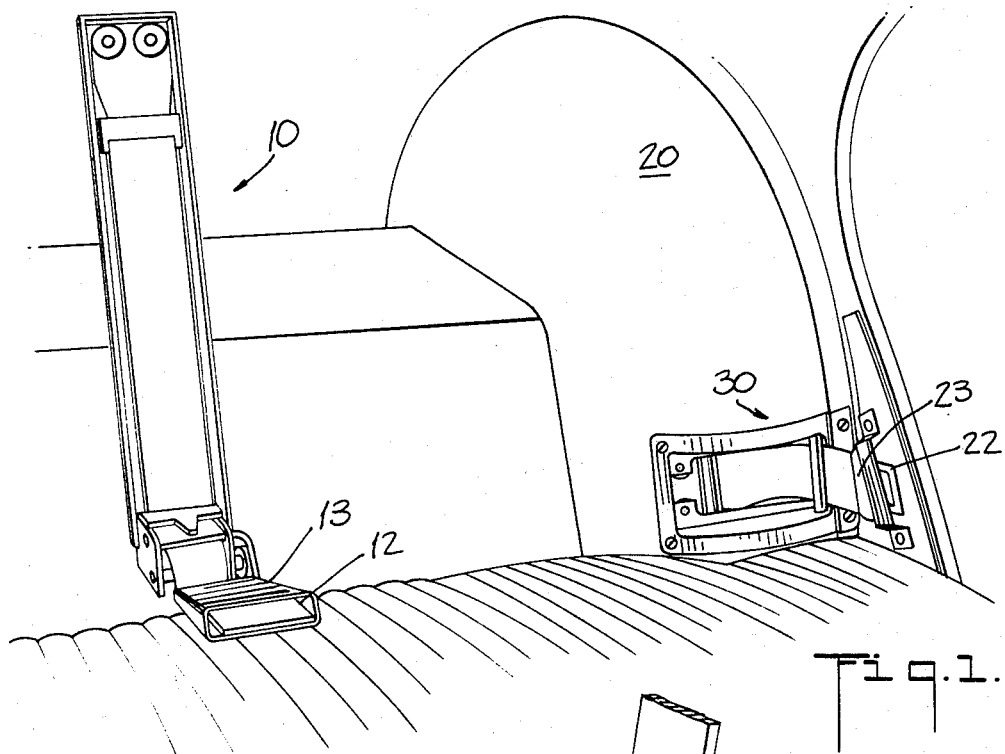
FIGURE 1 is an isometric view of the retractor system at one passenger position in the rear seat, with the seat backrest removed.

Referring to FIGURE 1, the seat belt retractor system for one rear passenger position is shown. In this case the position is that of the rear left passenger. The system comprises an inboard retractor 10 and an outboard retractor 30. The position for the rear right passenger would be the mirror image of the one shown. For systems three abreast, the middle system will comprise two inboard retractors 10. Each retractor takes advantage of the configuration and characteristics of the rear seat. The outboard retractor 30 is positioned in a special boot 31 which is fitted in a cut out in the wheel well 20 and occupies otherwise unused space. In order to provide retractors for both belt straps for passengers sitting three abreast it is necessary to position the outboard buckle members 22 at the vehicle wall beyond the furthest end of the seat since it would not be possible to seat three passengers between the wheel wells. The position of the outboard retractors facilitates such positioning. The inboard retractor 10 is positioned just behind the rear seat and is secured at the top to rear deck 11 and at the bottom to the trunk floor. Both retractors are positioned off-the-seat to serve up a mating buckle member 12, 22 at the level of the rear seat 25 in retractor sleeves 13 and 23 respectively. The inboard retractors are provided with automatic sensing mechanisms which are responsive to a passenger leaving his seat position in a manner hereinafter described.

Figure 2:
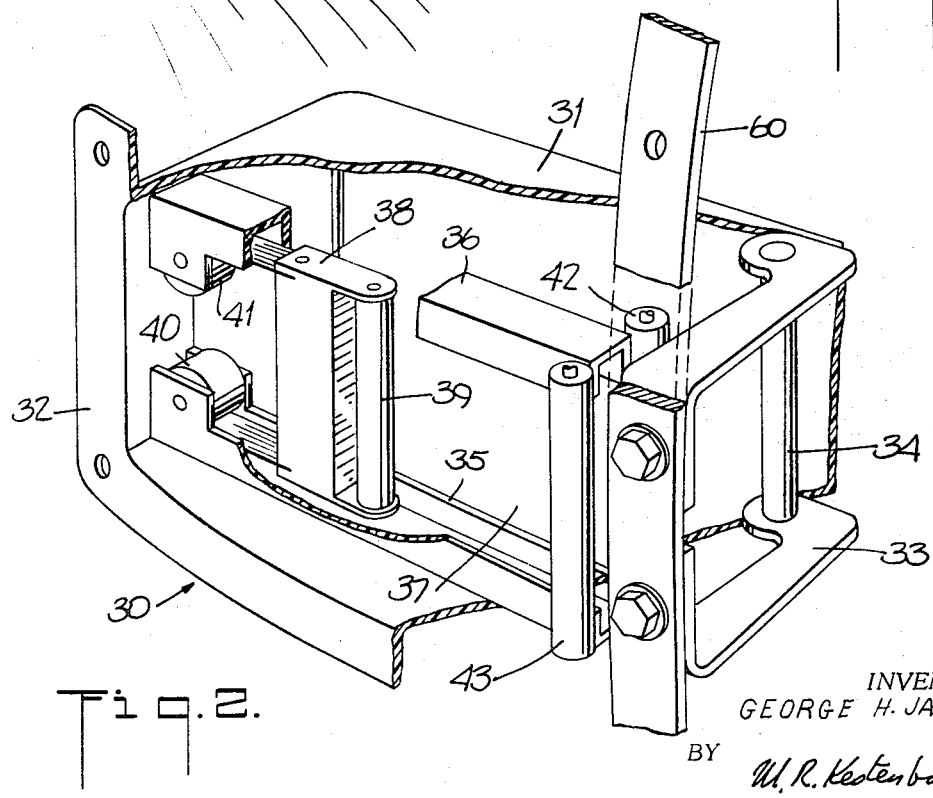
FIGURE 2 is an isometric view of the outboard retractor within its receiving boot.

The outboard retractor will now be described with reference to FIGURES 2, 3 and 4. The outboard retractor shown generally at 30, has its retractor mechanism secured at top and bottom by conventional fasteners within the boot 31. The boot is made of tough plastic material having smooth inner surfaces. The boot 31 itself is secured by conventional fasteners at its contoured flange 32 to the correspondingly contoured portion of the wheel well which extends within the rear seat area. Behind the furthest outboard portion of the contoured flange 32 a steel anchor 33 is secured to a doubling member 60 fitted and attached along the curved underside of the wheel 20 to distribute the load from the anchor 33 over a large area. At one end of the anchor 33 and firmly joined to the anchor at top and bottom is a strap pick up rod 34. The belt strap (not shown in FIGURE 2) is anchored to the pick up rod 34 which is intended to take the full shock load in use and transfer it to the vehicle structure through the anchor 33. A pair of guide channels 35, 36 run in the long direction of the boot opening 37. These channels provide a path for slide member 38. A roller 39 is journalled at one end of the slide member 38 and the ends of a pair of self-winding springs 40 and 41 are secured at the other end of slide member 38. The bias of the springs 40 and 41 serves to urge the slide member towards the springs with constant tension throughout the slide travel.

A pair of guide rollers 42 and 43 are attached top and bottom to the boot 31 and serve to change the path of the strap as it passes through the retractor.

In the retracted position, as seen schematically in FIGURE 3, the release fitting 22 is positioned by retractor sleeve 23. The release fitting strap 21 is secured to the release fitting in a conventional manner. Strap 21 enters the boot 31, turns about the guide roller 43, passes to loop about the slide roller 39 and returns to the guide roller 42.

The strap 21 turns again at the guide roller 42 and is looped around pick up rod 34 and stitched to itself.

Generally, length adjustment to fit the individual wearer is accomplished on only one of the two belt straps, usually, the buckle strap. In this embodiment, the release fitting strap 21 is taken up by the outboard retractor 30. Hence no length adjustment is necessary for it. The strap 21 is made long enough to extend the release fitting 22 from its retracted position on the vehicle wall at the side of the rear seat 25 to a convenient position at the wearer's left hip.

The length of travel of the slide member 38 is selected to retract the release fitting 22 to a tensioned position within the retractor sleeve 23, and all other dimensions of the retractor are determined in relation thereto. The length of web 21 (and hence the travel of slide member 38) is relatively short since the release fitting 22 must be swiftly retracted into its sleeve 23 to prevent it from being carried out of the door by the movement of the passenger upon exiting. As shown schematically in FIGURE 4, when the wearer pulls out fully on the release fitting 22, the self-winding springs 40, 41 unwind and the slide member 38 travels along the guide channels 35, 36 to a point at which the strap 21 extends from the anchor pick up rod 34 substantially straight out of the retractor sleeve 23. In this extended position, the strap 21 provides substantially in-line loading from the take up rod 34 to the release fitting 22. The slide member 38 is effectively removed from the load bearing path, so as to contribute little or no "give" under shock load conditions.

The inboard retractor will now be described with reference to FIGURES 5, 6 and 7. The retractor 10 is comprised of an elongated track 14 and a cover 15 positioned thereon. In the embodiment shown, the retractor 10 is attached by a conventional fastener to and behind the skirt portion of the rear deck 11 and to the face of metal wall 16 which connects the trunk floor 17 to the lower interior floor 18.

The position of the retractor 10 takes advantage of the space behind the rear seat backrest at the boundary of the passenger and trunk compartments. The board which partitions these compartments can be set in front of or behind the retractor 10. In this orientation the retractor 10 does not occupy otherwise used space.

A pair of self-winding springs 19, 44 are attached towards the upper end of the track 14, and restrained from movement normal to the track by plastic disks 45, 46. One end of each spring is secured towards the opposite sides of slide member 47, whose slide path is defined by the track 14. A roller 48 is journalled at the lower end of the slide member 47.

The nature of the self-winding springs is such as to apply a constant upward tension, to the slide member 47 throughout its travel.

Mounted toward the bottom of the retractor 10 is self-activating snubbing device 49. The buckle strap 50 is firmly secured between the metal face 16 and the snubbing device 49 and proceeds upwards in the cavity formed by the track 14 and the cover 15, around the roller 48 and then down again about the guide roller 51 and through the snubber mechanism 49 and the retractor sleeve 13 to be adjustably attached to a suitable buckle member 12.

The snubber mechanism 49 is comprised of a body member 52 having walls 53, 54 between which are mounted a number of working members. These include a rigid serrated plate 55 and serrated cam 56. Cam 56 is constantly biased towards plate 55 by spring 57 held in place upon the cam 56 by lip member 58.

The pivot axis of the cam 56 is off-centered in the direction of retraction with respect to the mid-point of its serrated surface. The strap 50 passes between the serrated surfaces of the cam 56 and the rigid plate 55. When permitted to do so, the spring 57 will naturally force the serrated surface of cam 56 against the strap 50 to grip the strap between the cam 56 and the plate 55. The gripping action cannot be broken by movement of the strap 50 in the retraction direction. Such movement only serves to increase the grip of the members on the strap 50 due to the cammed nature of the serrated surface of cam 56. However, movement of the strap 50 in the extension direction is permitted because such movement serves to pivot the serrated surface of cam 56 out of contact with the face of the strap 50, against the force of spring 57.

Cam 56 is attached at its pivot axis to follower rod 59 which is actuated by a second cam 61 pivotably mounted to wall 54 of the snubber. The second cam 61 is rotated by the up and down movement of activating rod 65 to which it is attached at its pivot axis. The activating rod is attached at its other end to a seat spring at about the center of a passenger position.

When the passenger occupies the seat, his weight forces the activating rod 65 downward. This movement of the activating rod rotates cam 61 so as to permit follower rod 59 to move lower. In this position of the follower rod 59, the cam 56 to which it is directly attached is free to act as above described. The strap 50 can be pulled to a position of full extension from the retractor, but the action of the cam 56 and plate 55 will prevent its retraction.

When the passenger unbuckles the belt and leaves the seat, the activating arm moves upward causing the cam 61 to raise the level of the follower rod 59 which lifts the cam 56 out of gripping engagement with the plate 55 on the strap 50 between them. Strap 50 is thereby freed to be retracted by the retractor 10. The adjustment of the activating rod 65 to the cam 61 by adjustment screw 66 controls and synchronizes the operation of the snubber mechanism to the movement of the activating rod 65 by the seat spring 62. As arrange, adjustment screw is oriented to be accessible from the seat 25, to facilitate adjustment.

FIGURES 8 and 9 show an advantageous embodiment of the activating arm 65 for greater sensitivity to the presence of a passenger on the seat. This is particularly advantageous in the tight rear seat in which three sets of passenger sensing retractors are placed side by side and close together. In this embodiment the short activating arm 63 is slideably fitted in the hole at one end of bracket 64 which is attached to spring 62. For any given depression of seat spring 62, the activating arm will rotate the cam 61 to a degree which varies inversely with the length of the activating arm. Bracket 64 carries the downward movement from the depression of seat spring 62, further to the rear. Hence activating arm 63 is short and rotates cam 61 to a greater degree which increases the responsiveness of the snubber mechanism to occupancy of the seat.

It should be understood that although the invention has been described with reference to a specific embodiment, this embodiment is not intended to be limiting in any way. Changes and modifications in this embodiment can be made without departing from the spirit and teachings of this invention.

What is claimed is:
1. Seat belt retractor system in combination with a vehicle having a seat positioned on a floor between wheel walls which extend inwardly from the vehicle sides, com- prising inboard and outboard off-the-seat retractors, said outboard retractor being mounted within one of said wheel walls and serving to position the free end of its belt near one of said vehicle sides, said inboard retractor being of elongated configuration oriented to extend downward behind said seat to be supported towards one end by the rear deck behind said seat and towards its other end by said vehicle floor and serving to position the free end of its belt between the cushion and the backrest of said seat.

2. Seat belt retractor system according to claim 1 in which said inboard retractor is supported towards said other end by the metal face between the trunk floor and the lower passenger floor.

3. Seat belt retractor system according to claim 1 in which said outboard retractor is positioned within a boot fitted in a cut-out in said wheel well.

4. Seat belt retractor system according to claim 3 in which said outboard retractor comprises guide means attached within said boot and angularly disposed to said vehicle side, means supported by said vehicle for anchoring said belt, slide means having roller means thereon and mounted for reciprocal movement along said guide and spring means for urging said slide means away from said anchor means, said belt entering said boot and passing between said roller means and said spring means to said anchor means.

5. An outboard seat belt retractor in combination with a vehicle having a seat positioned on a floor between wheel wells which extend inwardly from the vehicle sides, comprising a boot fitted within a cut-out in one of said wheel wells, guide means attached within said boot and angularly disposed to one of said vehicle sides, means supported by said wheel well for anchoring said belt, slide means having roller means thereon and mounted for reciprocal movement along said guide and spring means for urging said slide means away from said vehicle side, said belt entering said boot and passing between said roller means and said spring means to said anchor means.

6. An outboard seat belt retractor according to claim 5 in which said boot has top and bottom interior surfaces, said guide means comprising a first guide channel attached to said top interior surface and a second guide channel attached to said bottom interior surface opposite said first guide channel, said spring means being self-winding and attached towards one end of said guide channels, a pair of spaced apart guide rollers are attached towards the other end of said guide channels, said slide means being attached to said spring means and slideable in said guide channels towards and away from said spring means, a belt pick up rod attached to said anchor means and positioned deeper within said boot than said guide rollers.

7. A vehicle inboard seat belt retractor comprising a track of elongated configuration oriented to extend downward behind said seat, and supported by said vehicle floor, self-winding spring means attached towards the upper end of said track, a slide member positioned for reciprocal movement in said track towards and away from said spring means, a belt roller journalled to said slide member, and belt snubber means attached to said vehicle floor at the lower end of said track.

8. An inboard retractor in accordance with claim 7 in which said snubber means comprises a body member having a pair of spaced walls thereon, a rigid plate and a pivotable cam attached to said walls for gripping a seat belt therebetween, the pivot axis of said cam being offset in the direction of retraction with respect to the midpoint of its gripping surface, spring means for urging said cam towards gripping engagement with said belt, a follower attached to said cam at its pivot axis, a second cam pivotably attached to said body member to actuate said follower, and an activating arm attached at one end to the pivot axis of said second cam and adapted at its other end to be actuated by a spring of said seat.

9. An inboard retractor in accordance with claim 8 in which said activating arm is secured to said second cam by an adjustment screw capable of orientation in a generally upward direction.

10. An inboard retractor in accordance with claim 8 which an elongated bracket member is secured to said seat spring and oriented to extend towards the rear of said seat, said activating rod being slideably connected to said bracket at the rearward extending portion thereof.

11. A bracket member for actuating a seat belt snubber activating arm and adapted to be secured to a seat spring beneath a vehicle seat, said bracket member having an elongated portion adapted to extend towards the rear of said seat and having means on said rearward extending portion for slideable connection with said activating arm.

References Cited
UNITED STATES PATENTS

| | | | |
|---|---|---|---|
| 3,174,704 | 3/1965 | Replogle | 297—385 |
| 3,259,434 | 7/1966 | Frey | 297—385 |
| 3,262,738 | 7/1966 | Jantzen | 297—385 |

BENJAMIN HERSH, *Primary Examiner.*

R. R. SONG, *Assistant Examiner.*